US010919416B2

(12) United States Patent
Hodgson et al.

(10) Patent No.: US 10,919,416 B2
(45) Date of Patent: Feb. 16, 2021

(54) VEHICLE INTERIOR COMPONENT

(71) Applicant: Shanghai Yanfeng Jinqiao Automotive Trim Systems Co. Ltd., Novi, MI (US)

(72) Inventors: Thomas Scott Hodgson, Holland, MI (US); Jiunn Tyng Chen, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 180 days.

(21) Appl. No.: 16/359,329

(22) Filed: Mar. 20, 2019

(65) Prior Publication Data
US 2019/0291606 A1 Sep. 26, 2019

Related U.S. Application Data

(60) Provisional application No. 62/648,202, filed on Mar. 26, 2018.

(51) Int. Cl.
| B60N 3/00 | (2006.01) |
| B60N 2/10 | (2006.01) |
| B60R 7/04 | (2006.01) |
| B60R 16/023 | (2006.01) |
| B60R 16/03 | (2006.01) |

(52) U.S. Cl.
CPC .............. *B60N 2/10* (2013.01); *B60N 3/001* (2013.01); *B60R 7/04* (2013.01); *B60R 16/023* (2013.01); *B60R 16/03* (2013.01)

(58) Field of Classification Search
CPC ...... B60N 2/10; B60N 3/001; B60N 2/01516; B60N 2002/0264; B60R 7/04; B60R 16/023; B60R 16/03
USPC .................................................... 296/193.04
See application file for complete search history.

(56) References Cited

U.S. PATENT DOCUMENTS

| 6,910,723 B2 * | 6/2005 | Kawabe ............... | B60N 2/0155 248/503.1 |
| 8,215,695 B2 * | 7/2012 | Ida ...................... | B60N 2/3077 296/65.03 |
| 10,603,997 B2 * | 3/2020 | Bergstrom ............... | B60G 3/08 |
| 2009/0212190 A1 * | 8/2009 | Dahlbacka ............. | B60N 2/075 248/429 |
| 2017/0057380 A1 * | 3/2017 | Vikstrom ............. | B60N 2/0232 |

(Continued)

Primary Examiner — Pinel E Romain
(74) Attorney, Agent, or Firm — Amin, Turocy & Watson, LLP

(57) ABSTRACT

A component for a vehicle interior is disclosed. The component may comprise a module and a support to couple the module to the vehicle comprising a mechanism. The module may move from an unlocked position to a locked position to secure the module to the vehicle. The mechanism may adjust between an open state and a closed state securing the module to the vehicle. The support may comprise a member and the module may comprise a hook to engage the member; the hook may rotate about the member as the module moves to the locked position. The component may comprise a cover moveable from a closed position to cover the mechanism to an open position to uncover the mechanism. The cover may move in response to engagement and disengagement of the hook with the member. The module may comprise a pin to adjust the mechanism.

20 Claims, 10 Drawing Sheets

(56) References Cited

U.S. PATENT DOCUMENTS

2018/0228677 A1\* 8/2018 Hargraves .......... B60N 2/01583
2020/0055423 A1\* 2/2020 Prozzi .................... B60N 2/015

\* cited by examiner

VEHICLE INTERIOR COMPONENT

CROSS-REFERENCE TO RELATED APPLICATIONS

The present application claims priority to and incorporates by reference in full the following patent application: U.S. Provisional Patent Application No. 62/648,202 titled "VEHICLE INTERIOR COMPONENT" filed Mar. 26, 2018.

FIELD

The present invention relates to a component for a vehicle interior. The present invention also relates to a modular component system configured to couple a module for a vehicle interior. The present invention further relates to a modular vehicle interior component system.

BACKGROUND

It is known to provide a module for a vehicle interior.

It would be advantageous to provide a component for a vehicle interior comprising a module or set of modules such as interchangeable/replaceable modules and a support/base configured to couple a module or set of modules to the vehicle. It would also be advantageous to provide a support/base configured to couple a module or set of replaceable modules to the vehicle.

SUMMARY

The present invention relates to a component for a vehicle interior comprising a module; and a support configured to couple the module to the vehicle comprising a mechanism. The module may be configured to move relative to the support from an unlocked position to a locked position to secure the module to the vehicle. The mechanism may be configured for adjustment between an open state and a closed state. The mechanism may be configured to secure the module to the vehicle in the closed state. The support may comprise a member and the module may comprise a hook. The hook may be configured to engage the member when the module is in the unlocked position; the hook may be configured to rotate about the member as the module moves relative to the support from the unlocked position to the locked position to secure the module to the vehicle. The component may comprise a cover configured to move from a closed position to cover the mechanism to an open position to uncover the mechanism. The cover may be configured to move from the closed position to the open position in response to engagement of the hook with the member. The cover may be configured to move from the open position to the closed position in response to disengagement of the hook from the member. The module may comprise a pin configured to adjust the mechanism from the closed state to the open state as the module moves from the unlocked position toward the locked position. The support may comprise an electrical connector and the module may comprise an electrical connector; the electrical connector of the module may be at least one of (a) surrounded by a base of the module and the pin of the module; (b) coupled to a base of the module in a volume defined by the base of the module and the pin of the module. The mechanism may comprise a user interface configured to adjust the mechanism from the closed state to the open state to facilitate movement of the module from the locked position toward the unlocked position. The mechanism may be configured to move the module from the locked position toward the unlocked position in response to actuation of the user interface. The mechanism may be configured to adjust from the closed state to the open state, move the module from the locked position toward the unlocked position, and adjust from the open state to the closed state in response to actuation of the user interface. The support may comprise a base; the base may comprise an electrical connector and the module may comprise an electrical connector; the base may comprise a guide configured to guide movement of the module relative to the support to align the electrical connector of the module with the electrical connector of the base as the module moves from the unlocked position toward the locked position. The module may comprise at least one of (a) a device; (b) a unit; (c) a system; (d) a seat; (e) a seating system; (f) a child seat; (g) a support; (h) a console; (i) a floor console; (j) storage; (k) a storage compartment; (l) a functional unit; (m) a multi-purpose unit; (n) a multi-function unit; (o) a power source; (p) a data connection; (q) a network connection; (r) a multi-purpose module; (s) a multi-function module; (t) a multi-function system; (u) a table.

The present invention relates to a modular component system configured to couple a module for a vehicle interior comprising a base configured for attachment of the module; and an interface between the module and the base. The interface may comprise a mechanism to secure the module to base. The mechanism may be configured for adjustment to a closed state. The mechanism may be configured to secure the module to the vehicle in the closed state. The interface may comprise (a) an electrical connector of the base configured to connect with an electrical connector of the module; (b) a guide configured to guide movement of the module to align the electrical connector of the module with the electrical connector of the base as the module moves from an unlocked position toward a locked position. The base may comprise a support; the mechanism may be configured to retain a pin of the module to couple the module and the support. The mechanism may comprise a user interface configured to adjust the mechanism from the closed state to an open state to facilitate movement of the module from a locked position toward an unlocked position. The mechanism may be configured to move the module from the locked position toward the unlocked position in response to actuation of the user interface. The user interface may comprise a control. The mechanism may be configured to adjust from the closed state to the open state, move the module from the locked position toward the unlocked position, and adjust from the open state to the closed state in response to actuation of the user interface. The system may further comprise a cover configured to move from a closed position to cover the mechanism to an open position to uncover the mechanism. The cover may be configured to move from the closed position to the open position in response to engagement of the module with the base. The cover may be configured to move from the open position to the closed position in response to disengagement of the module from the base.

The present invention relates to a component for a vehicle interior comprising a module and a support. The module may comprise a base, a hook and a pin. The support may be configured to couple the module to the vehicle. The support may comprise a base, a member and a mechanism. The hook may be configured for engagement with the member. The mechanism may be configured to retain the pin to couple the module to the support. The module may be configured to move relative to the support from an unlocked position to a locked position to secure the module to the vehicle. The hook may be configured to engage the member when the module is in the unlocked position. The hook may be configured to rotate about the member as the module moves relative to the support from the unlocked position to the locked position to secure the module to the vehicle. The mechanism may be configured for adjustment between an open state and a closed state. The mechanism may be configured to secure the module to the vehicle in the closed state. The pin may be configured to adjust the mechanism from the closed state to the open state as the module moves from the unlocked position toward the locked position. The mechanism may comprise a spring configured to adjust the mechanism from the open state to the closed state. The mechanism may comprise a user interface configured to adjust the mechanism from the closed state to the open state to facilitate movement of the module from the locked position toward the unlocked position. The mechanism may be configured to move the module from the locked position toward the unlocked position in response to actuation of the user interface. The mechanism may be configured to adjust from the closed state to the open state, move the module from the locked position toward the unlocked position, and adjust from the open state to the closed state in response to actuation of the user interface. The support may comprise an electrical connector; and the module may comprise an electrical connector. The support may comprise a guide configured to guide movement of the module relative to the support to align the electrical connector of the module with the electrical connector of the support as the module moves from the unlocked position toward the locked position. The electrical connector of the module may surrounded by the base of the module and the pin of the module. The electrical connector of the module may be coupled to the base of the module in a volume defined by the base of the module and the pin of the module. The component may comprise a cover configured to move from a closed position to cover the mechanism to an open position to uncover the mechanism. The cover may be configured to move from the closed position to the open position in response to engagement of the hook with the member. The cover may be configured to move from the open position to the closed position in response to disengagement of the hook from the member. The hook may comprise a set of hooks. The pin may comprise a set of pins and the mechanism may comprise a set of mechanisms. The module may comprise at least one of (a) a device; (b) a unit; (c) a system; (d) a seat; (e) a seating system; (f) a child seat; (g) a support; (h) a console; (i) a floor console; (j) storage; (k) a storage compartment; (l) a functional unit; (m) a multi-purpose unit; (n) a multi-function unit; (o) a power source; (p) a data connection; (q) a network connection; (r) a multi-purpose module; (s) a multi-function module; (t) a multi-function system; (u) a table.

The present invention relates to a component configured to couple a module providing a base, a hook and a pin to a vehicle. The component may comprise a base, a member and a mechanism configured to retain the pin of the module to couple the module and the support. The mechanism may be configured for adjustment between an open state and a closed state. The mechanism may be configured to secure the module to the vehicle in the closed state. The mechanism may comprise a spring configured to adjust the mechanism from the open state to the closed state. The mechanism may comprise a user interface configured to adjust the mechanism from the closed state to the open state to facilitate movement of the module from a locked position toward an unlocked position. The mechanism may be configured to move the module from the locked position toward the unlocked position in response to actuation of the user interface. The mechanism may be configured to adjust from the closed state to the open state, move the module from the locked position toward the unlocked position, and adjust from the open state to the closed state in response to actuation of the user interface. The component may comprise an electrical connector configured to connect with an electrical connector of the module. The component may comprise a guide configured to guide movement of the module to align the electrical connector of the module with the electrical connector of the support as the module moves from an unlocked position toward a locked position. The component may comprise a cover configured to move from a closed position to cover the mechanism to an open position to uncover the mechanism. The cover may be configured to move from the closed position to the open position in response to engagement of the module with the member. The cover may be configured to move from the open position to the closed position in response to disengagement of the module from the member. The module may comprise at least one of (a) a device; (b) a unit; (c) a system; (d) a seat; (e) a seating system; (f) a child seat; (g) a support; (h) a console; (i) a floor console; (j) storage; (k) a storage compartment; (l) a functional unit; (m) a multi-purpose unit; (n) a multi-function unit; (o) a power source; (p) a data connection; (q) a network connection; (r) a multi-purpose module; (s) a multi-function module; (t) a multi-function system; (u) a table.

The present invention relates to a vehicle interior component system for connecting a module in an interior of a vehicle comprising a structure and at least one vehicle system. The system may comprise a base configured to be attached to the structure in the interior of the vehicle and a connector system configured to couple the module to the vehicle through the base; the base may be configured for movement relative to the interior of the vehicle; the connector system may comprise an interface to the module. The connector system may comprise a mechanism. The interface may comprise an electrical connection to the module. The electrical connection may comprise a data connection to a vehicle system. The interface may comprise at least one of (a) power connectivity; (b) data connectivity; (c) power supply; (d) network connectivity; (e) mechanical connectivity. The module may comprise at least one of (a) a device; (b) a unit; (c) a system; (d) a seat; (e) a seating system; (f) a child seat; (g) a support; (h) a console; (i) a floor console; (j) storage; (k) a storage compartment; (l) a functional unit; (m) a multi-purpose unit; (n) a multi-function unit; (o) a power source; (p) a data connection; (q) a network connection; (r) a multi-purpose module; (s) a multi-function module; (t) a multi-function system; (u) a table. The structure in the interior of the vehicle may comprise a floor structure and the mechanical connection may comprise attachment to the floor structure. At least one vehicle system may comprise vehicle systems; vehicle systems may comprise at least one of (a) power system; (b) data system; (c) network; (d) display system; (e) instrumentation system; (f) control system; (g) safety system; (h) monitoring system. The system may comprise a modular vehicle interior component system.

FIGURES

DESCRIPTION

Figure 1A:
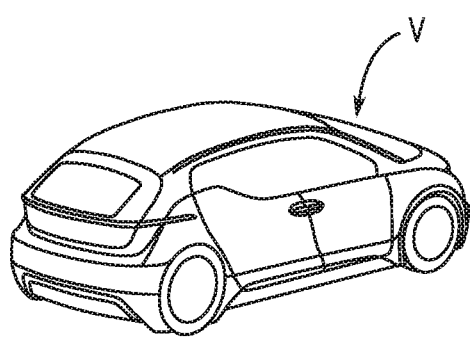
FIG. 1A is a schematic perspective view of a vehicle according to an exemplary embodiment.
Figure 1B:
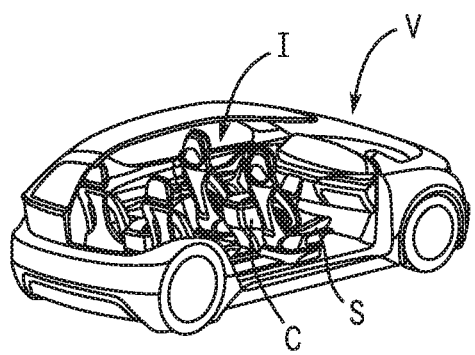
FIG. 1B is a schematic perspective cut-away view of the vehicle showing a vehicle interior according to an exemplary embodiment.
Figure 1C:
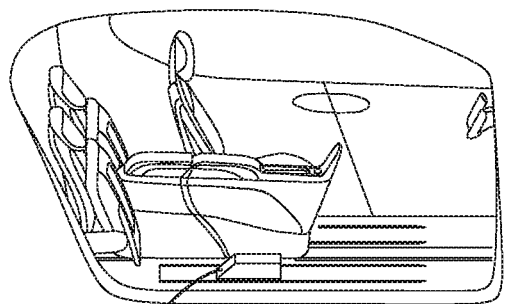
FIGS. 1C-1F are schematic perspective cut-away views showing a module coupling to a support in a vehicle interior according to an exemplary embodiment.
Figure 1D:
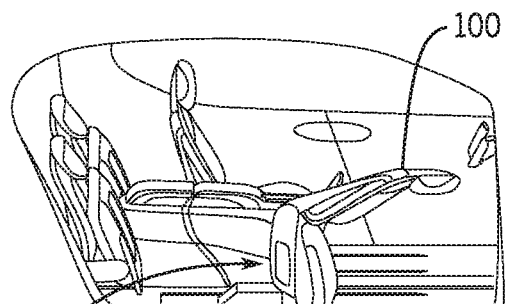
Figure 1E:
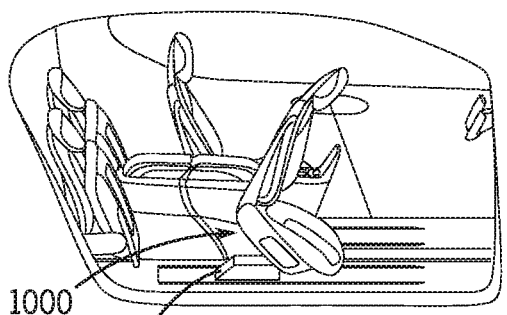
Figure 1F:
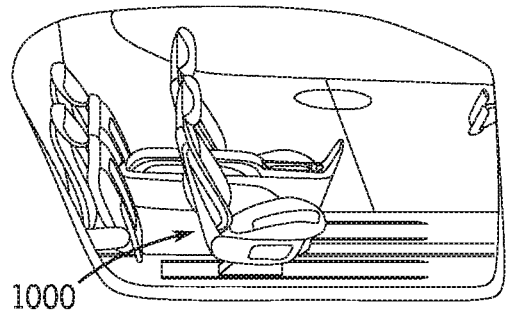

Referring to FIGS. 1A and 1B according to an exemplary embodiment, a set of vehicle interior components shown as comprising at least a seat S and a console C are shown provided for a vehicle V with an interior I. According to an exemplary embodiment as indicated schematically, the vehicle may comprise a conventional vehicle, autonomous vehicle, etc.

Figure 9:
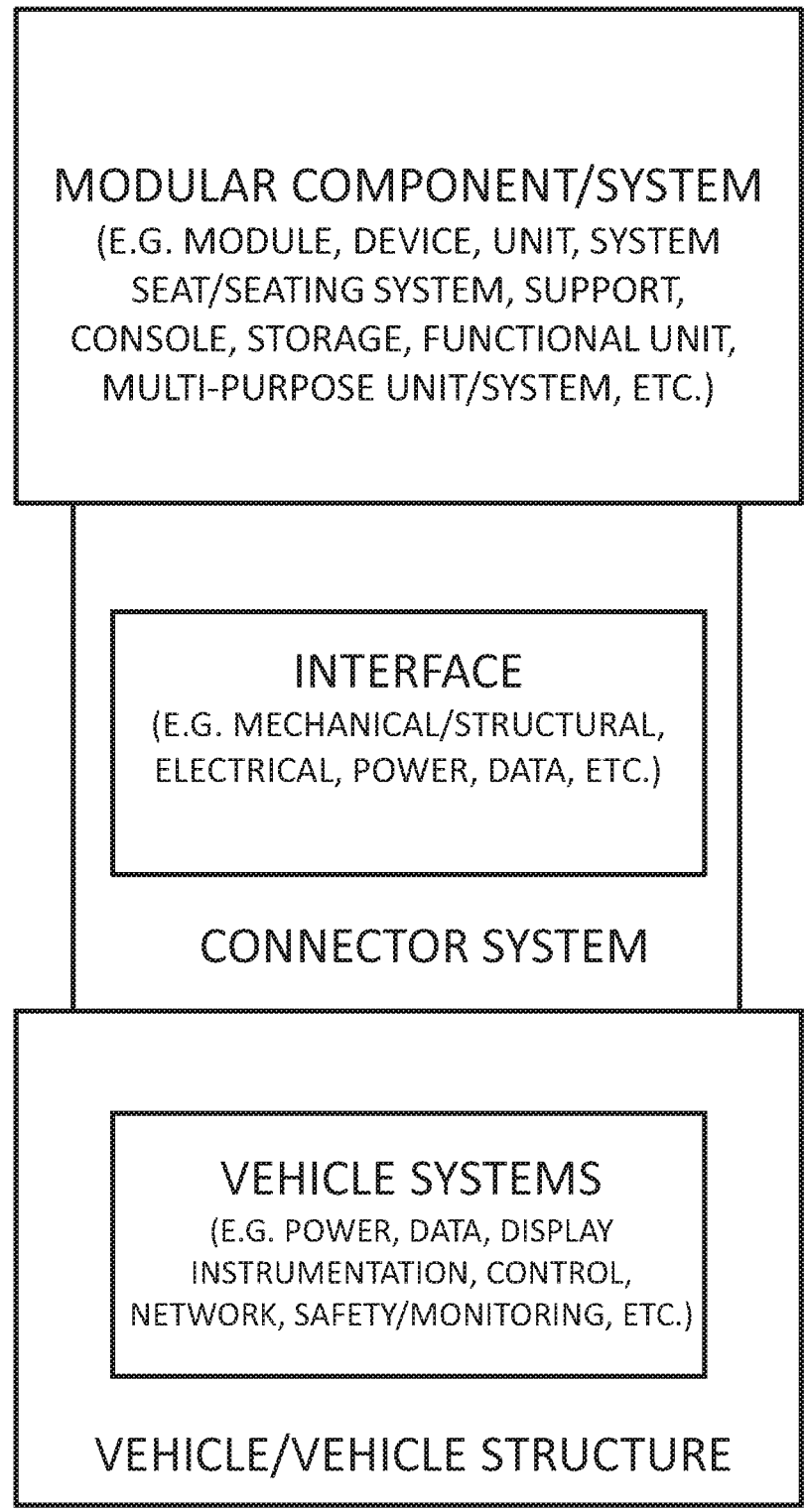
FIG. 9 is a system block diagram of the vehicle interior component system for a vehicle according to an exemplary embodiment.

According to an exemplary embodiment as shown schematically in FIGS. 1C to 1F, a system may be provided to connect a vehicle interior component in the interior of the vehicle; the system may comprise a module 100 and a support 200. Support 200 may comprise a base. As shown schematically in FIGS. 1C-1F, a support 200 may be configured to couple a module 100 to the vehicle (e.g. vehicle interior/structure). Module 100 shown as a seat may be configured to move relative to support 200 from an unlocked position as shown schematically in FIG. 1D to a locked position as shown schematically in FIG. 1F to secure module 100 to the vehicle. Module 100 may comprise at least one of (a) a seat; (b) a console, (c) a storage compartment. See also FIG. 9.

According to an exemplary embodiment as shown schematically in FIGS. 1C-1F, 2A-2C, 3A-3D, 4A-4G, 5A, 5B, 6A-6C, 7A-7C, 8A-8D and 9, a component 1000 for a vehicle interior may comprise a module 100 and a support 200 configured to couple module 100 to the vehicle comprising a mechanism 230. Module 100 may be configured to move relative to support 200 from an unlocked position to a locked position to secure module 100 to the vehicle. See e.g. FIGS. 1D-1F, 4B-4G, and 6B-6C. Mechanism 230 may be configured for adjustment between an open state and a closed state. See e.g. FIGS. 6A-6C. Mechanism 230 may be configured to secure module 100 to the vehicle in the closed state. See e.g. FIG. 6C. Support 200 may comprise a member 214 and module 100 may comprise a hook 134. Hook 134 may be configured to engage member 214 when module 100 is in the unlocked position; hook 134 may be configured to rotate about member 214 as module 100 moves relative to support 200 from the unlocked position to the locked position to secure module 100 to the vehicle. See e.g. FIGS. 3A-3B, 4A-4G and 5A-5B. Component 1000 may comprise a cover 220 configured to move from a closed position to cover mechanism 230 to an open position to uncover mechanism 230. See e.g. FIGS. 3A-3B, 4A-4B and 5A-5B. Cover 220 may be configured to move from the closed position to the open position in response to engagement of hook 134 with member 214. See e.g. FIGS. 3A-3B, 4A-4B and 5A-5B. Cover 220 may be configured to move from the open position to the closed position in response to disengagement of hook 134 from member 214. Module 100 may comprise a pin 132 configured to adjust mechanism 230 from the closed state to the open state as module 100 moves from the unlocked position toward the locked position. See e.g. FIGS. 6A-6C. Support 200 may comprise an electrical connector 202 and module 100 may comprise an electrical connector 120; electrical connector 120 of module 100 may be at least one of (a) surrounded by a base of module 100 and the pin of module 100; (b) coupled to a base of module 100 in a volume defined by the base of module 100 and the pin of module 100. See e.g. FIGS. 2A and 3A-3B. Mechanism 230 may comprise a user interface 240 configured to adjust mechanism 230 from the closed state to the open state to facilitate movement of module 100 from the locked position toward the unlocked position. See e.g. FIGS. 7A-7C. Mechanism 230 may be configured to move module 100 from the locked position toward the unlocked position in response to actuation of user interface 240. See e.g. FIGS. 7A-7C. Mechanism 230 may be configured to adjust from the closed state to the open state, move module 100 from the locked position toward the unlocked position, and adjust from the open state to the closed state in response to actuation of user interface 240. See e.g. FIGS. 7A-7C. Support 200 may comprise a base; the base may comprise an electrical connector 202 and module 100 may comprise an electrical connector 120; the base may comprise a guide 234/236 configured to guide movement of module 100 relative to support 200 to align electrical connector 120 of module 100 with electrical connector 202 of the base as module 100 moves from the unlocked position toward the locked position. See e.g. FIGS. 6A-6C. Module 100 may comprise at least one of (a) a device; (b) a unit; (c) a system; (d) a seat; (e) a seating system; (f) a child seat; (g) a support; (h) a console; (i) a floor console; (j) storage; (k) a storage compartment; (l) a functional unit; (m) a multi-purpose unit; (n) a multi-function unit; (o) a power source; (p) a data connection; (q) a network connection; (r) a multi-purpose module; (s) a multi-function module; (t) a multi-function system; (u) a table.

According to an exemplary embodiment as shown schematically in FIGS. 1C-1F, 2A-2C, 3A-3D, 4A-4G, 5A, 5B, 6A-6C, 7A-7C, 8A-8D and 9, a modular component system configured to couple a module 100 for a vehicle interior comprising a base 200 configured for attachment of module 100; and an interface 300 between module 100 and base 200. The interface may comprise a mechanism 230 to secure module 100 to base 200. See e.g. FIG. 6C. Mechanism 230 may be configured for adjustment to a closed state. See e.g. FIGS. 6A-6C. Mechanism 230 may be configured to secure module 100 to the vehicle in the closed state. See e.g. FIG. 6C. Interface 300 may comprise (a) an electrical connector 202 of base 200 configured to connect with an electrical connector 120 of module 100; (b) a guide 234/236 configured to guide movement of module 100 to align electrical connector 120 of module 100 with electrical connector 202 of the base as module 100 moves from an unlocked position toward a locked position. See e.g. FIGS. 6A-6C. Base may comprise a support; mechanism 230 may be configured to retain a pin 132 of module 100 to couple module 100 and support 200. See e.g. FIGS. 6A-6C. Mechanism 230 may comprise a user interface 240 configured to adjust mechanism 230 from the closed state to an open state to facilitate movement of module 100 from a locked position toward an unlocked position. See e.g. FIGS. 7A-7C. Mechanism 230 may be configured to move module 100 from the locked position toward the unlocked position in response to actuation of user interface 240. See e.g. FIGS. 7A-7C. User interface 240 may comprise a control. Mechanism 230 may be configured to adjust from the closed state to the open state, move module 100 from the locked position toward the unlocked position, and adjust from the open state to the closed state in response to actuation of user interface 240. See e.g. FIGS. 7A-7C. The system may further comprise a cover 220 configured to move from a closed position to cover mechanism 230 to an open position to uncover mechanism 230. See e.g. FIGS. 3A-3B, 4A-4B and 5A-5B. Cover 220 may be configured to move from the closed position to the open position in response to engagement of module 100 with base 200. See e.g. FIGS. 3A-3B, 4A-4B and 5A-5B. Cover 220 may be configured to move from the open position to the closed position in response to disengagement of module 100 from base 200.

Figure 2A:
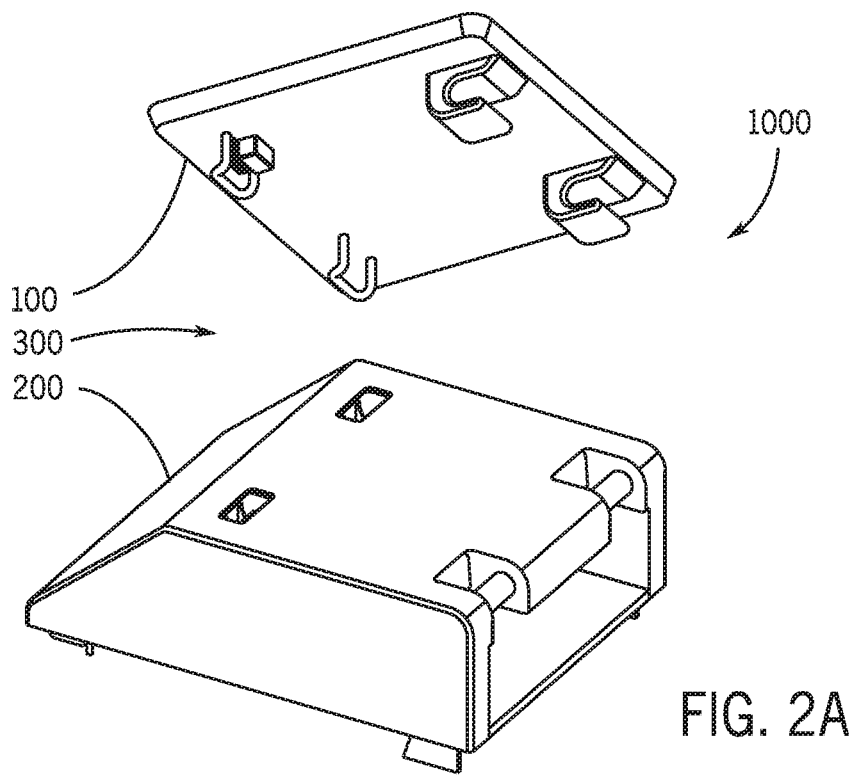
FIG. 2A is an exploded perspective view of a vehicle interior component according to an exemplary embodiment.

According to an exemplary embodiment as shown schematically in FIG. 2A, vehicle interior component 1000 may comprise a module 100 and a support 200.

Figure 2B:
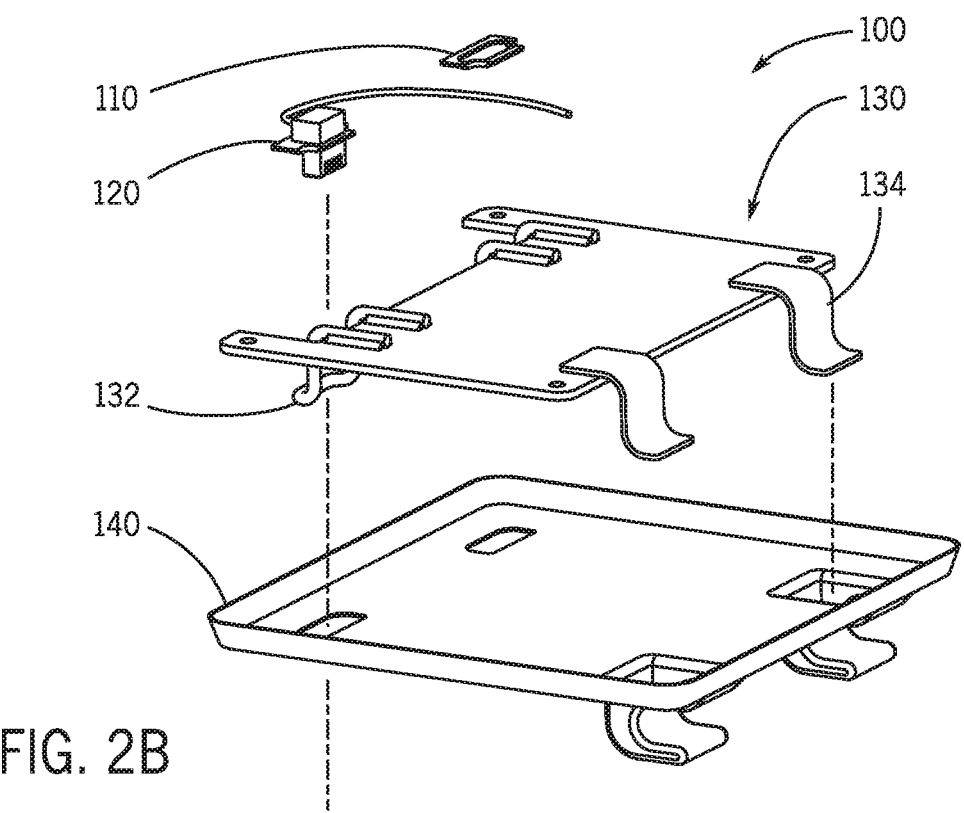
FIG. 2B is an exploded perspective view of a module of a vehicle interior component according to an exemplary embodiment.

According to an exemplary embodiment as shown schematically in FIG. 2B, module 100 may comprise a bezel 110, an electrical connector 120, a base 130 and a cover 140. Base 130 may comprise a pin or set of pins 132 and a hook or set of hooks 134. Module 100 may comprise at least one of (a) a device, (b) a unit, (c) a system, (d) a seat, (e) a seating system, (f) a child seat; (g) a support, (h) a console, (i) a floor console, (j) storage, (k) a storage compartment, (l) a functional unit, (m) a multi-purpose unit, (n) a multi-function unit, (o) a power source, (p) a data connection, (q) a network connection, (r) a multi-purpose module, (s) a multi-function module, (t) a multi-function system; (u) a table.

Figure 2C:
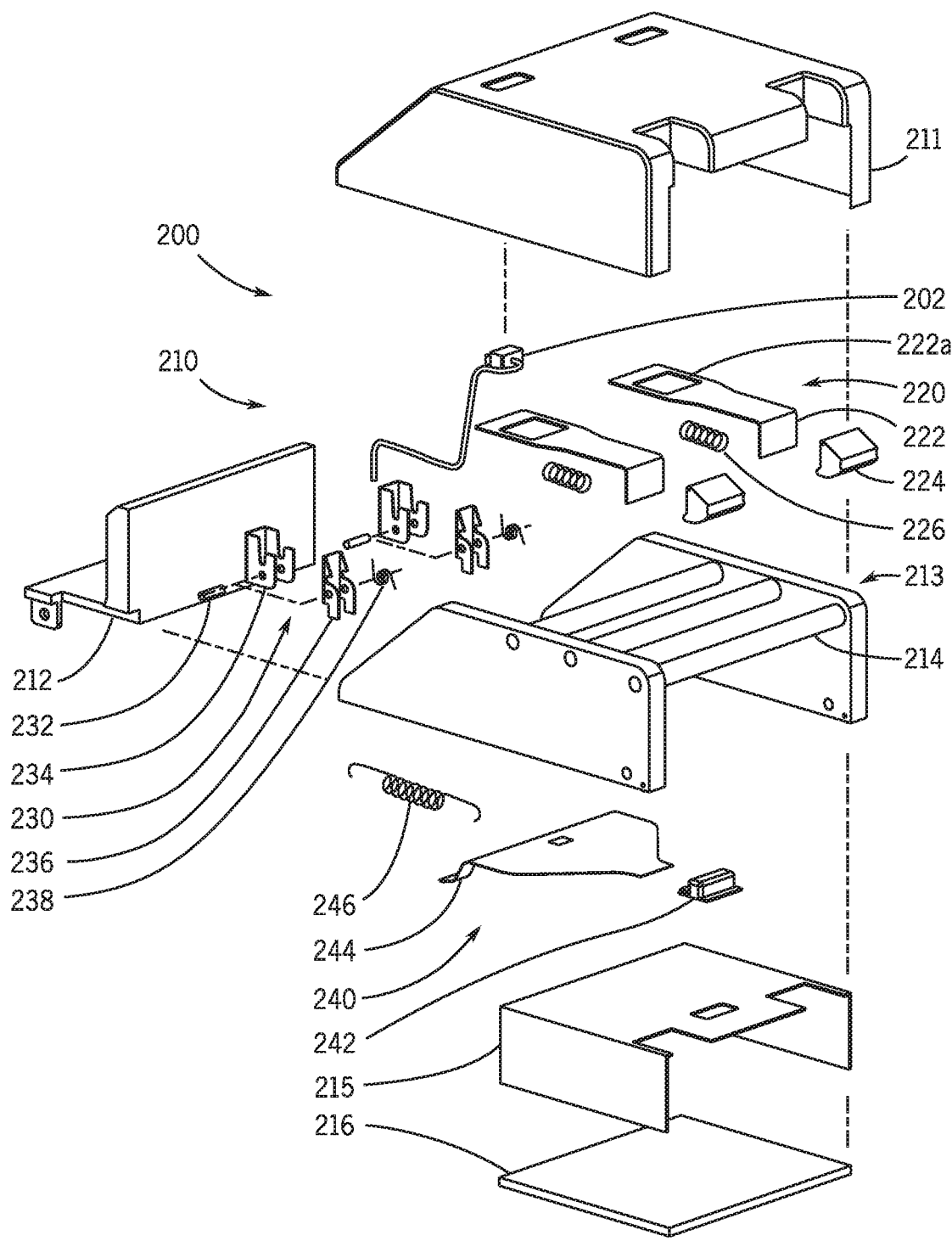
FIG. 2C is an exploded perspective view of a vehicle interior component or a support of a vehicle interior component according to an exemplary embodiment.

According to an exemplary embodiment as shown schematically in FIG. 2C, support 200 may comprise an electrical connector 202, a base 210, a cover assembly or set of cover assemblies 220, a mechanism or set of mechanisms 230 and a user interface assembly 240. Base 210 may comprise a member 214 and at least one of portions 211, 212, 213, 215 and 216. Cover assembly 220 may comprise a cover 222, a cam 224 and a spring 226. Cover 222 may comprise an aperture 222a. Mechanism 230 may comprise a pivot pin or set of pivot pins 232, a fixed portion or set of fixed portions 234, a moveable portion or set of moveable portions 236 and a spring or set of springs 238. User interface assembly 240 may comprise a user interface 242, an arm 244 and a spring 246. User interface 242 may comprise a control. Member 214 may comprise a bar.

According to an exemplary embodiment, support 200 may be configured to couple module 100 to the vehicle. See e.g. FIGS. 1C-1F. Hook or set of hooks 134 may be configured for engagement with member 214. See e.g. FIGS. 3A-3B, 4A-4G and 5A-5B. Mechanism 230 may be configured to retain pin or set of pins 132 to couple module 100 to support 200. See e.g. FIGS. 4D, and 6A-6C. Module 100 may be configured to move relative to support 200 from an unlocked position to a locked position to secure module 100 to the vehicle. See e.g. FIGS. 1D-1F, 4B-4G, and 6B-6C. Hook or set of hooks 134 may be configured to engage member 214 when module 100 is in the unlocked position. See e.g. FIGS. 3B, 4B and 5B. Hook or set of hooks 134 may be configured to rotate about member 214 as module 100 moves relative to support 200 from the unlocked position to the locked position to secure module 100 to the vehicle. See e.g. FIGS. 3B-3D and 4B-4G. Mechanism 230 may be configured for adjustment between an open state and a closed state. See e.g. FIGS. 6A-6C. Mechanism 230 may be configured to secure module 100 to the vehicle in the closed state. See e.g. FIG. 6C. Pin or set of pins 132 may be configured to adjust mechanism 230 from the closed state to the open state as module 100 moves from the unlocked position toward the locked position. See e.g. FIGS. 6A-6C. Spring or set of springs 238 may be configured to adjust mechanism 230 from the open state to the closed state. User interface assembly 240/user interface 242 may be configured to adjust mechanism 230 from the closed state to the open state to facilitate movement of module 100 from the locked position toward the unlocked position. See e.g. FIGS. 7A-7C. Mechanism 230 may be configured to move module 100 from the locked position toward the unlocked position in response to actuation of user interface assembly 240/user interface 242. See e.g. FIGS. 7A-7C. Mechanism 230 may be configured to adjust from the closed state to the open state, move module 100 from the locked position toward the unlocked position, and adjust from the open state to the closed state in response to actuation of the user interface assembly 240/user interface 242. See e.g. FIGS. 7A-7C. Support 200 may comprise a guide 234/236 configured to guide movement of module 100 relative to support 200 to align electrical connector 120 of module 100 with electrical connector 202 of support 200 as module 100 moves from the unlocked position toward the locked position. See e.g. FIGS. 6A-6C. Electrical connector 120 of module 100 may be surrounded by base 130 of module 100 and pin 132 of module 100. See e.g. FIGS. 2A and 3A-3B. Electrical connector 120 of module 100 may be coupled to base 130 of module 100 in a volume defined by base 130 of module 100 and pin 132 of module 100. See e.g. FIGS. 2A and 3A-3B. Cover assembly 220/cover 222 may be configured to move from a closed position to cover mechanism 230 to an open position to uncover mechanism 230. See e.g. FIGS. 3A-3B, 4A-4B and 5A-5B. Cover assembly 220/cover 222 may be configured to move from the closed position to the open position in response to engagement of hook or set of hooks 134 with member 214. See e.g. FIGS. 3A-3B, 4A-4B and 5A-5B. Cover assembly 220/cover 222 may be configured to move from the open position to the closed position in response to disengagement of hook or set of hooks 134 from member 214.

Figure 3A:
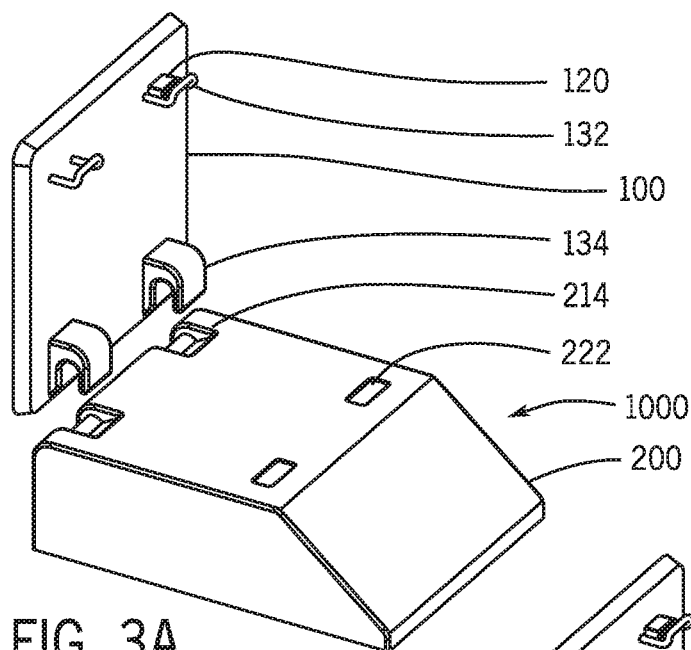
FIGS. 3A-3D are schematic perspective views showing a module coupling to a support for a vehicle interior according to an exemplary embodiment.
Figure 3B:
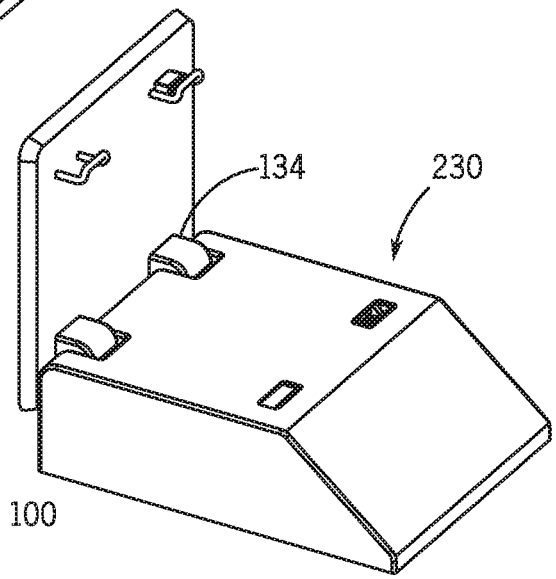
Figure 3C:
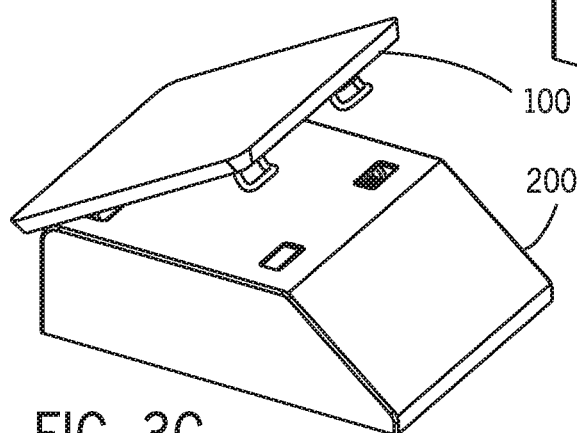
Figure 3D:
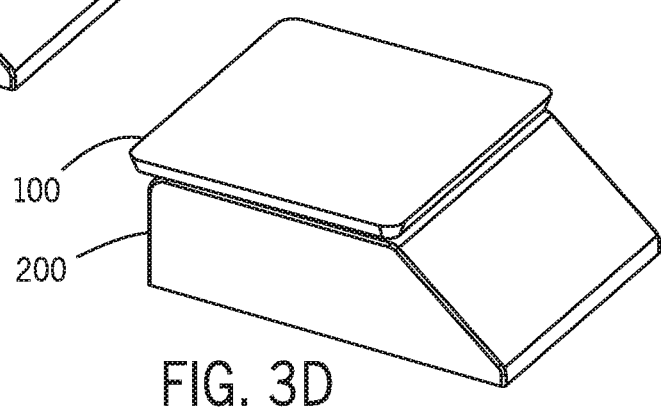
Figure 4A:
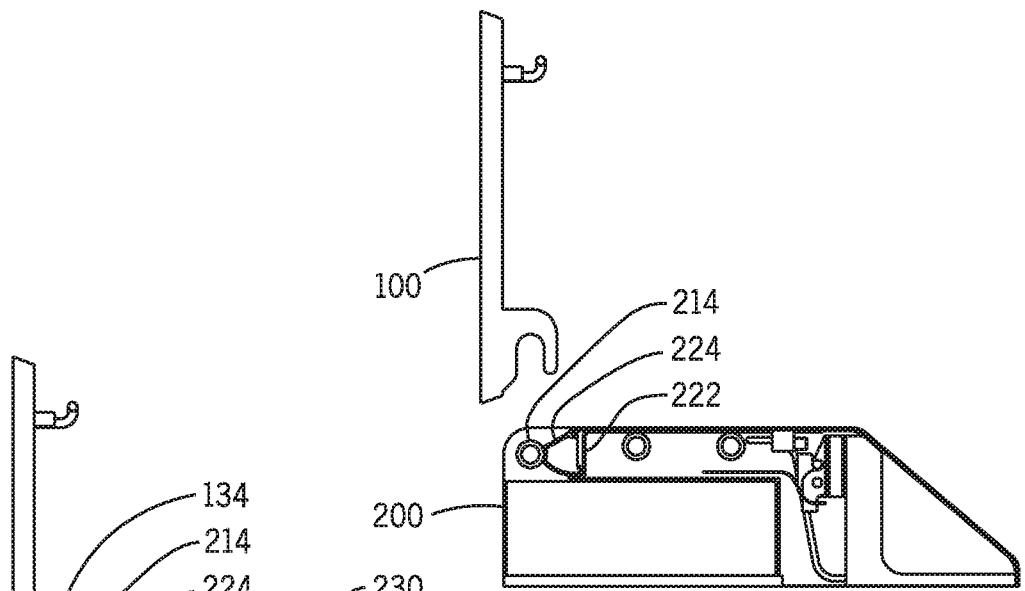
FIGS. 4A-4D are schematic side elevation section views showing a module coupling to a support for a vehicle interior according to an exemplary embodiment.
Figure 4B:
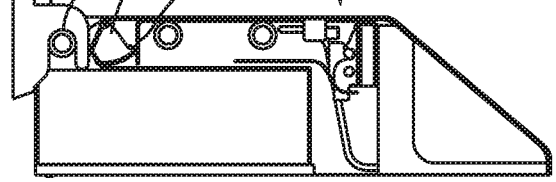
Figure 4C:
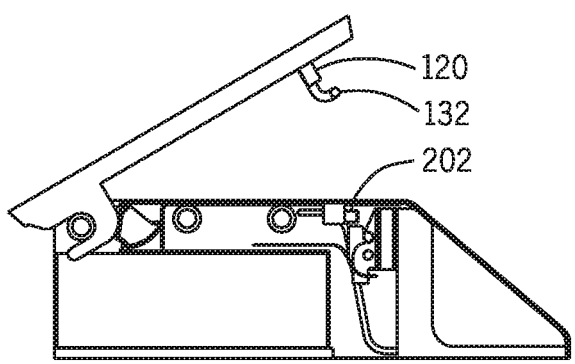
Figure 4E:
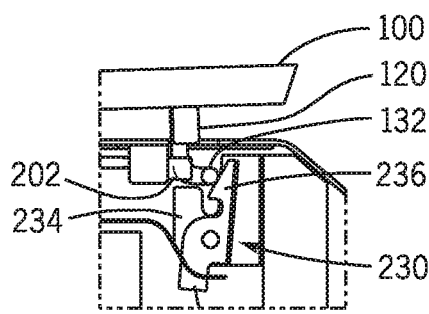
FIGS. 4E-4G are schematic side elevation section views of detail of a module and support for a vehicle interior component according to an exemplary embodiment.
Figure 4F:
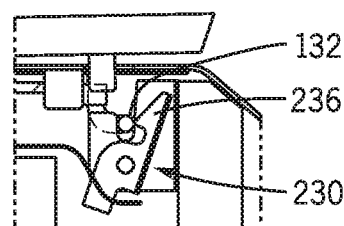
Figure 4D:
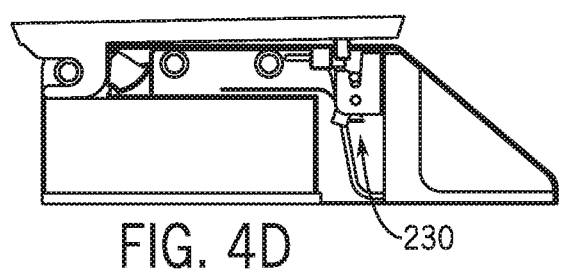
Figure 4G:
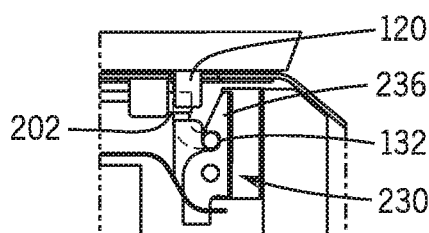

According to an exemplary embodiment as shown schematically in FIGS. 3A-3D, hook or set of hooks 134 may be configured to rotate about member 214 as module 100 moves relative to support 200 from an unlocked position as shown schematically in FIG. 3B to a locked position as shown schematically in FIG. 3D to secure module 100 to the vehicle. Hook or set of hooks 134 may be configured for engagement with member 214 as shown schematically in FIGS. 3A-3B. Hook or set of hooks 134 may be configured to engage member 214 when module 100 is in the unlocked position as shown schematically in FIG. 3B. Electrical connector 120 of module 100 may be surrounded by base 130 of module 100 and pin 132 of module 100; electrical connector 120 of module 100 may be coupled to base 130 of module 100 in a volume defined by base 130 of module 100 and pin 132 of module 100 as shown schematically in FIGS. 3A-3B. Cover assembly 220/cover 222 may be configured to move from a closed position to cover mechanism 230 as shown schematically in FIG. 3A to an open position as shown schematically in FIG. 3B-3C to uncover mechanism 230. Cover assembly 220/cover 222 may be configured to move from the closed position to the open position in response to engagement of hook or set of hooks 134 with member 214 as shown schematically in FIGS. 3A-3B; cover assembly 220/cover 222 may be configured to move from the open position to the closed position in response to disengagement of hook or set of hooks 134 from member 214.

According to an exemplary embodiment as shown schematically in FIGS. 4A-4G, hook or set of hooks 134 may be configured for engagement with member 214. Hook or set of hooks 134 may be configured to engage member 214 when module 100 is in the unlocked position as shown schematically in FIG. 4B. Hook or set of hooks 134 may be configured to rotate about member 214 as module 100 moves relative to support 200 from the unlocked position to the locked position to secure module 100 to the vehicle as shown schematically in FIGS. 4B-4G. Module 100 may be configured to move relative to support 200 from the unlocked position as shown schematically in FIG. 4B to a locked position as shown schematically in FIG. 4D to secure module 100 to the vehicle. Cover assembly 220/cover 222 may be configured to move from a closed position to cover mechanism 230 as shown schematically in FIG. 4A to an open position as shown schematically in FIG. 4B to uncover mechanism 230. Cover assembly 220/cover 222 may be configured to move from the closed position to the open position in response to engagement of hook or set of hooks 134 with member 214 as shown schematically in FIGS. 4A-4B; cover assembly 220/cover 222 may be configured to move from the open position to the closed position in response to disengagement of hook or set of hooks 134 from member 214. Mechanism 230 may be configured to retain pin or set of pins 132 to couple module 100 to support 200 as shown schematically in FIG. 4D.

Figure 5A:
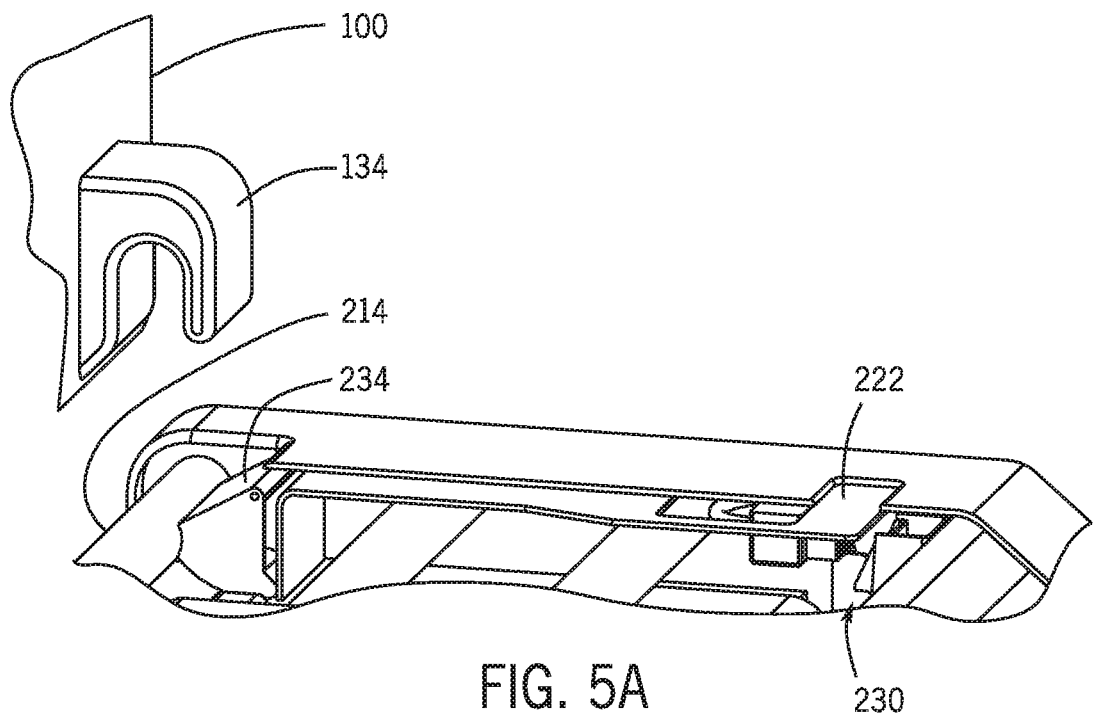
FIGS. 5A-5B are schematic perspective cut-away views of a module engaging a support in a vehicle interior according to an exemplary embodiment.
Figure 5B:
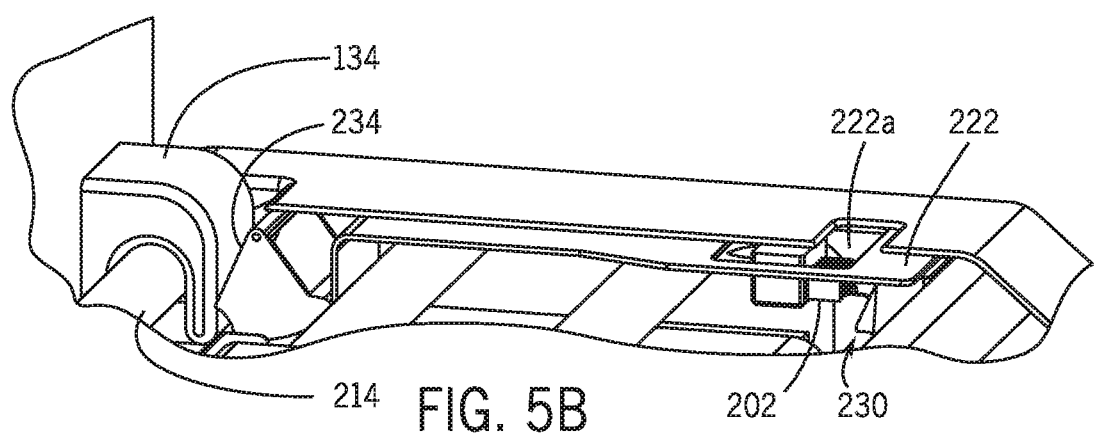

According to an exemplary embodiment as shown schematically in FIGS. 5A-5B, cover assembly 220/cover 222 may be configured to move from a closed position as shown schematically in FIG. 5A to cover mechanism 230 to an open position as shown schematically in FIG. 5B to uncover mechanism 230. Cover assembly 220/cover 222 may be configured to move from the closed position to the open position in response to engagement of hook or set of hooks 134 with member 214 as shown schematically in FIGS. 5A-5B; cover assembly 220/cover 222 may be configured to move from the open position to the closed position in response to disengagement of hook or set of hooks 134 from member 214. Hook or set of hooks 134 may be configured for engagement with member 214 as shown schematically in FIGS. 5A-5B; hook or set of hooks 134 may be configured to engage member 214 when module 100 is in the unlocked position as shown schematically in FIG. 5B.

Figure 6A:
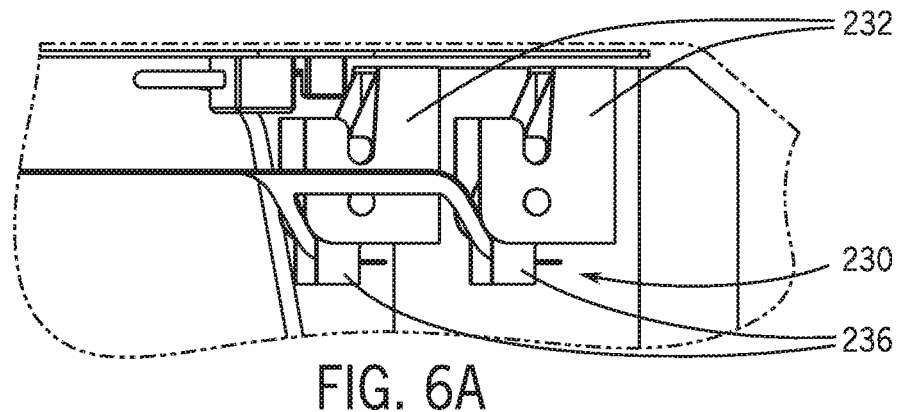
FIGS. 6A-6C are schematic perspective cut-away views of a module coupling to a support in a vehicle interior according to an exemplary embodiment.
Figure 6B:
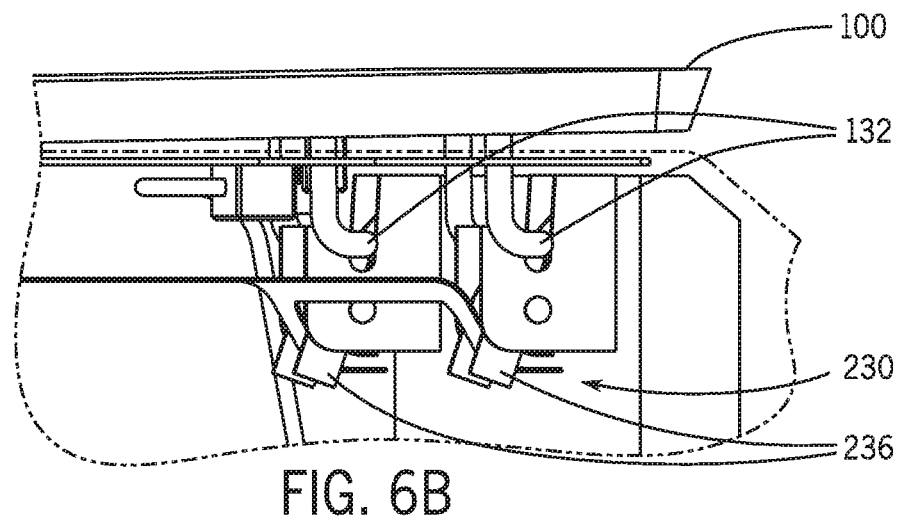
Figure 6C:
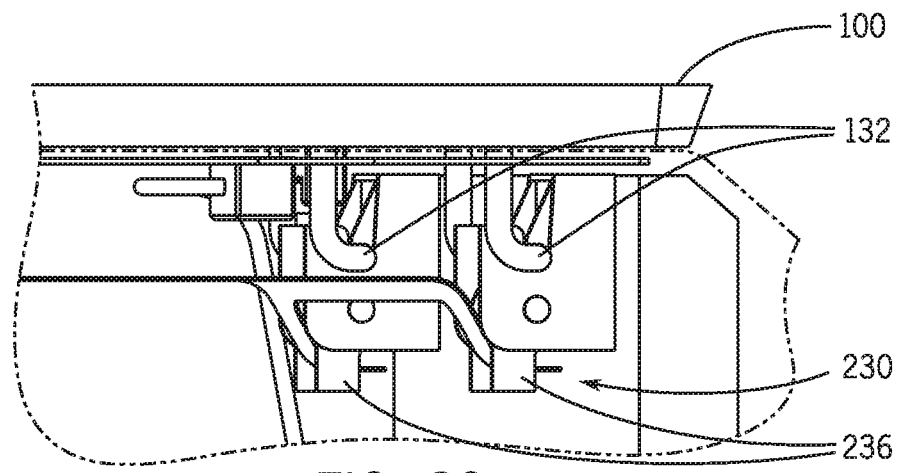

According to an exemplary embodiment as shown schematically in FIGS. 6A-6C, mechanism 230 may be configured for adjustment between an open state as shown schematically in FIG. 6B and a closed state as shown schematically in FIGS. 6A and 6C. Mechanism 230 may be configured to retain pin or set of pins 132 to couple module 100 to support 200; mechanism 230 may be configured to secure module 100 to the vehicle in the closed state as shown schematically in FIG. 6C. Pin or set of pins 132 may be configured to adjust mechanism 230 from the closed state to the open state as module 100 moves from the unlocked position toward the locked position as shown schematically in FIGS. 6A-6C. Support 200 may be configured to guide movement of module 100 relative to support 200 to align electrical connector 120 of module 100 with electrical connector 202 of support 200 as module 100 moves from the unlocked position toward the locked position as shown schematically in FIGS. 6B-6C.

Figure 7A:
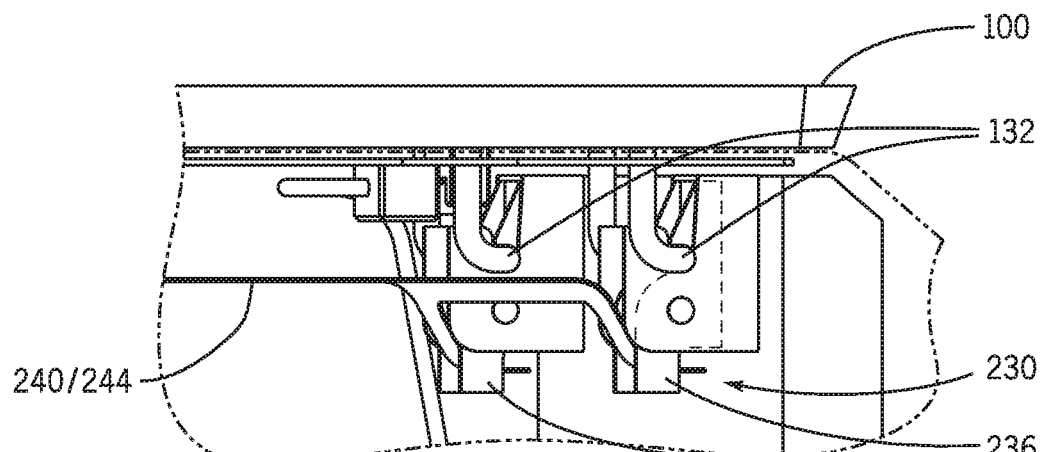
FIGS. 7A-7C are schematic perspective cut-away views showing a module decoupling from a support in a vehicle interior according to an exemplary embodiment.
Figure 7B:
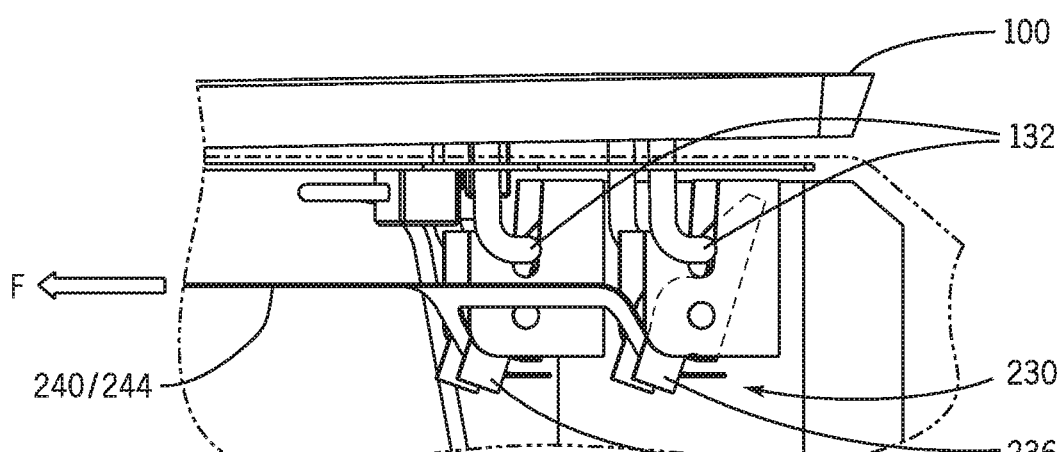
Figure 7C:
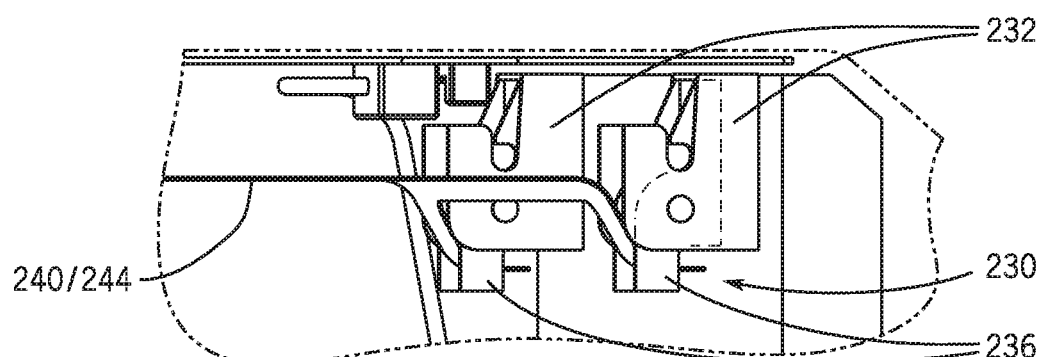

According to an exemplary embodiment as shown schematically in FIGS. 7A-7C, user interface assembly 240/user interface 242 may be configured to adjust mechanism 230 from a closed state as shown schematically in FIG. 7A to an open state as shown schematically in FIG. 7B to facilitate movement of module 100 from the locked position toward the unlocked position. Mechanism 230 may be configured to move module 100 from the locked position toward the unlocked position in response to actuation of user interface assembly 240/user interface 242; mechanism 230 may be configured to adjust from the closed state to the open state, move module 100 from the locked position toward the unlocked position, and adjust from the open state to the closed state in response to actuation of the user interface assembly 240/user interface 242 as shown schematically in FIGS. 7A-7C.

According to an exemplary embodiment as shown schematically in FIGS. 8A-8D, the system may be configured to facilitate movement of a module relative to a structure of the vehicle (e.g. floor/floor structure of the vehicle). The structure may comprise a track system T to facilitate movement of the module within the vehicle interior (e.g. relative to the floor of the vehicle). The track system T may a stationary track and/or a moveable track configured to move relative to the stationary track. As shown schematically, the system may comprise a support at the interface with the structure in the vehicle; the support may comprise at least one of a wheel and/or a set of wheels configured to guide movement of module relative to the floor of the vehicle (e.g. in guide, track, etc.); as indicated schematically the support arrangement may comprise a pin configured to engage a hook of the structure/vehicle interior (see e.g. FIGS. 4A-4G).

Figure 8A:
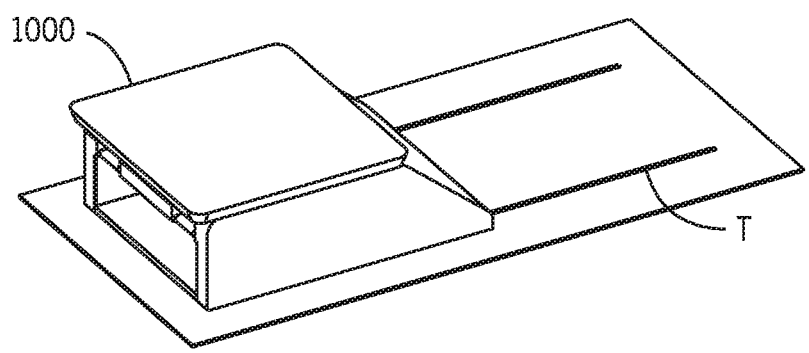
FIGS. 8A-8B are schematic perspective views showing a vehicle interior component moving within a vehicle interior according to an exemplary embodiment.
Figure 8B:
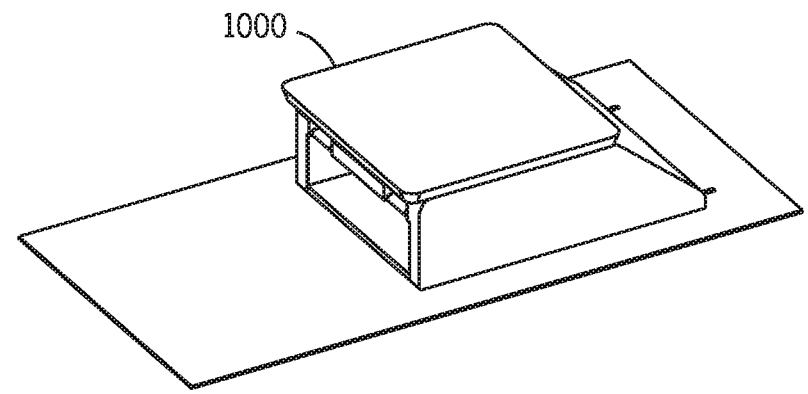
Figure 8C:
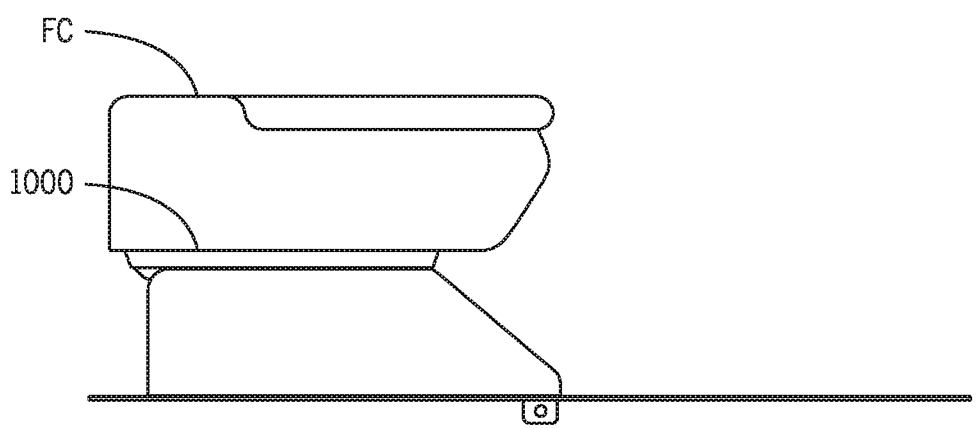
FIGS. 8C-8D are schematic side elevation views of a vehicle interior component with module coupled to support according to an exemplary embodiment.
Figure 8D:
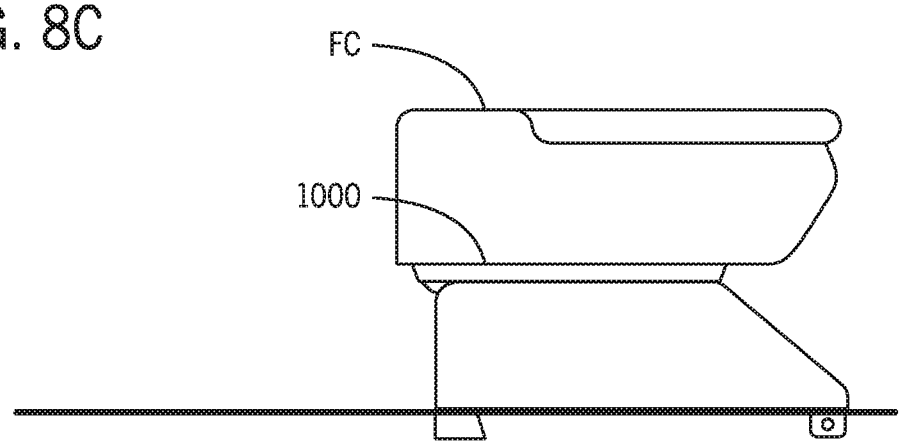

As shown schematically according to an exemplary embodiment in FIGS. 8C and 8D, the system may be configured for attachment of a module shown as a floor console FC (e.g. on support/structure and movable in vehicle interior). See also FIGS. 1B-1F (module shown as seat/system movable in vehicle interior). As indicated schematically, the system may be configured to connect the module to the vehicle/vehicle systems through an interface (e.g. mechanical/structural, electrical, power/data, etc.). See FIGS. 1B-1F, 8C-8D and 9. As shown schematically, the interface for power/data (e.g. electrical signals, power/charging, communications, instrumentation, etc.) is established by connection of electrical/data connector 120 and electrical/data connector 202. See FIGS. 3A-3D, 4C-4G, 5B and 9.

As shown schematically according to an exemplary embodiment in FIGS. 1C-1F, 2A-2C and 9, a vehicle interior component system may comprise a component with a connector system/interface to the vehicle/vehicle systems. As shown schematically according to an exemplary embodiment in FIG. 9, the vehicle interior component system may be configured for connecting a module in an interior of a vehicle comprising a structure and at least one vehicle system; the system may comprise a base configured to be attached to the structure in the interior of the vehicle and a connector system configured to couple the module to the vehicle through the base; the base may be configured for movement relative to the interior of the vehicle; the connector system may comprise an interface to the module. See also FIGS. 2A-2C and 8C-8D. The connector system may comprise a mechanism. See e.g. FIGS. 2A-2C and 4A-4G. As shown schematically in FIG. 9, the interface may comprise at least one of (a) power connectivity; (b) data connectivity; (c) power supply; (d) network connectivity; (e) mechanical connectivity. See also FIGS. 2A-2C and 8C-8D (e.g. interface may comprise an electrical connection to the module and to the vehicle; the electrical connection may comprise a data and/or power connection to a vehicle system, data connectors, power connectors, power source, etc.). As shown schematically according to an exemplary embodiment in FIGS. 1B-1F, 8C-8D and 9, a module may comprise (a) a device, (b) a unit, (c) a system, (d) a seat, (e) a seating system, (f) a child seat; (g) a support, (h) a console, (i) a floor console, (j) storage, (k) a storage compartment, (l) a functional unit, (m) a multi-purpose unit, (n) a multi-function unit, (o) a power source, (p) a data connection, (q) a network connection, (r) a multi-purpose module, (s) a multi-function module, (t) a multi-function system; (u) a table. As shown in FIGS. 8A-8D and 9, the structure in the interior of the vehicle may comprise a floor structure and the mechanical connection may comprise attachment to the floor structure; attachment may comprise an alignment/securing arrangement for components/connectors. See also FIGS. 2A-2C and 4A-4F. As shown schematically in FIG. 9, the system may connect a module to vehicle systems such as (a) power system; (b) data system; (c) network; (d) display system; (e) instrumentation system; (f) control system; (g) safety system; (h) monitoring system. As indicated schematically in FIG. 9, the system may comprise a modular vehicle interior component system (e.g. with modules that are interchangeable, replaceable, etc.).

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior comprising:
(a) a module; and
(b) a support configured to couple the module to the vehicle comprising a mechanism;
wherein the module is configured to move relative to the support from an unlocked position to a locked position to secure the module to the vehicle;
wherein the mechanism is configured for adjustment between an open state and a closed state;
wherein the mechanism is configured to secure the module to the vehicle in the closed state.

2. The component of claim 1 wherein the support comprises a member and the module comprises a hook.

3. The component of claim 2 wherein the hook is configured to engage the member when the module is in the unlocked position; and wherein the hook is configured to rotate about the member as the module moves relative to the support from the unlocked position to the locked position to secure the module to the vehicle.

4. The component of claim 2 comprising a cover configured to move from a closed position to cover the mechanism to an open position to uncover the mechanism.

5. The component of claim 4 wherein the cover is configured to move from the closed position to the open position in response to engagement of the hook with the member.

6. The component of claim 4 wherein the cover is configured to move from the open position to the closed position in response to disengagement of the hook from the member.

7. The component of claim 1 wherein the module comprises a pin configured to adjust the mechanism from the closed state to the open state as the module moves from the unlocked position toward the locked position.

8. The component of claim 7 wherein the support comprises an electrical connector and the module comprises an electrical connector; wherein the electrical connector of the module is at least one of (a) surrounded by a base of the module and the pin of the module; (b) coupled to a base of the module in a volume defined by the base of the module and the pin of the module.

9. The component of claim 1 wherein the mechanism comprises a user interface configured to adjust the mechanism from the closed state to the open state to facilitate movement of the module from the locked position toward the unlocked position.

10. The component of claim 9 wherein the mechanism is configured to move the module from the locked position toward the unlocked position in response to actuation of the user interface.

11. The component of claim 9 wherein the mechanism is configured to adjust from the closed state to the open state, move the module from the locked position toward the unlocked position, and adjust from the open state to the closed state in response to actuation of the user interface.

12. The component of claim 1 wherein the support comprises a base; wherein the base comprises an electrical connector and the module comprises an electrical connector; wherein the base comprises a guide configured to guide movement of the module relative to the support to align the electrical connector of the module with the electrical connector of the base as the module moves from the unlocked position toward the locked position.

13. The component of claim 1 wherein the module comprises at least one of (a) a device; (b) a unit; (c) a system; (d) a seat; (e) a seating system; (f) a child seat; (g) a support; (h) a console; (i) a floor console; (j) storage; (k) a storage compartment; (l) a functional unit; (m) a multi-purpose unit; (n) a multi-function unit; (o) a power source; (p) a data connection; (q) a network connection; (r) a multi-purpose module; (s) a multi-function module; (t) a multi-function system; (u) a table.

14. A modular component system configured to couple a module for a vehicle interior comprising:
a base configured for attachment of the module; and
an interface between the module and the base;
wherein the interface comprises a mechanism to secure the module to base;
wherein the mechanism is configured for adjustment to a closed state;
wherein the mechanism is configured to secure the module to the vehicle in the closed state.

15. The system of claim 14 wherein the interface comprises (a) an electrical connector of the base configured to connect with an electrical connector of the module; (b) a guide configured to guide movement of the module to align the electrical connector of the module with the electrical connector of the base as the module moves from an unlocked position toward a locked position.

16. The system of claim 14 wherein the base comprises a support; wherein the mechanism is configured to retain a pin of the module to couple the module and the support.

17. The system of claim 16 wherein the mechanism comprises a user interface configured to adjust the mechanism from the closed state to an open state to facilitate movement of the module from a locked position toward an unlocked position.

18. The system of claim 17 wherein the mechanism is configured to move the module from the locked position toward the unlocked position in response to actuation of the user interface; wherein the user interface comprises a control.

19. The system of claim 17 wherein the mechanism is configured to adjust from the closed state to the open state, move the module from the locked position toward the unlocked position, and adjust from the open state to the closed state in response to actuation of the user interface.

20. The system of claim 14 further comprising a cover configured to move from a closed position to cover the mechanism to an open position to uncover the mechanism;
wherein the cover is configured to move from the closed position to the open position in response to engagement of the module with the base;
wherein the cover is configured to move from the open position to the closed position in response to disengagement of the module from the base.

* * * * *